United States Patent [19]
Kindl et al.

[11] 3,916,337
[45] Oct. 28, 1975

[54] DISCHARGE CONTAINER STRUCTURE FOR A GAS LASER

[75] Inventors: Helmut Kindl, Westerham; Heinz Westermeier, Neubiberg, both of Germany

[73] Assignee: Siemens Aktiengesellschaft, Berlin & Munich, Germany

[22] Filed: Jan. 28, 1974

[21] Appl. No.: 437,313

[30] Foreign Application Priority Data
July 30, 1973 Germany............................ 2338502

[52] U.S. Cl............................. 331/94.5 D; 330/4.3
[51] Int. Cl.² ......................................... H01S 3/097
[58] Field of Search..................... 331/94.5; 330/4.3; 313/217

[56] References Cited
UNITED STATES PATENTS
3,828,277    8/1974    Otto et al..................... 331/94.5 PE Primary Examiner—William L. Sikes
Attorney, Agent, or Firm—Hill, Gross, Simpson, Van Santen, Steadman, Chiara & Simpson

[57] ABSTRACT

In a discharge structure for a gas laser having electrodes for the production of a gas discharge, wherein on a section of the discharge container of insulating material, a resistance layer is applied which forms a current-limiting resistor, and in which the section carrying the resistance layer is an arbitrary short-circuit and breakdown-proof wall portion of the discharge container.

16 Claims, 3 Drawing Figures

DISCHARGE CONTAINER STRUCTURE FOR A GAS LASER

BACKGROUND OF THE INVENTION

The present invention is directed to a discharge container structure for a gas laser having electrodes for the production of a gas discharge.

As is true of all gas discharge tubes, it is also necessary in the operation of a gas laser to make use of ohmic series resistances to provide a current limitation for the negative gas-discharge characteristic. The wire wound resistor or heavy duty film-type resistors normally employed for this purpose must have different resistance values in dependence upon the discharge container employed, so that for various laser with different discharge containers, the correct series resistance must be inserted at the desired point. The employment of an additional individual current limiting resistor additionally necessitated further components for the contacting and the mounting of such resistor.

The present invention thus is directed to the problem of producing a simple discharge container and current-limiting resistor which cannot be lost and which makes it possible, without additional difficulties, to operate various laser tubes with the same power supply unit.

BRIEF SUMMARY OF THE INVENTION

The problem is solved, in accordance with the present invention, in a discharge container of the type described, in which an arbitrarily selected portion of a wall of the discharge container having relatively high insulation characteristics, and thus which is substantially short-circuit and breakdown proof, carries a resistance layer applied thereto which forms the current-limiting resistor. The resistance layer preferably is disposed in direct proximity of the anode so that plasma oscillations can be avoided.

If the discharge container includes a laser capillary, the application of the current-limiting resistor may be formed as a layer resistor on the capillary structure, which enables the disposition of the resistor in close proximity to the anode, as compared to prior constructions utilizing a separate individual resistor member which could not be so disposed. The present invention is of particular advantage in connection with discharge containers involving a laser capillary constructed of ceramic material.

A discharge container constructed in accordance with the present invention does not require the resistance layer to be located on the laser capillary as it also may be arranged, particularly with respect to containers without a capillary structure, on another suitable portion of the wall structure of the discharge container which has the requisite insulating characteristics with respect to short circuits and breakdown. In such a construction it is advantageous if the resistance layer is terminated at both operative ends or sides by respective conductive sleeves carried by the container, one of which is electrically connected with the anode over a suitable conductor member, whereby a space remains between the anode and the adjacent conductive sleeve.

In the event the discharge container is provided with a tubular section forming a laser capillary, with the electrodes for the creation of the gas discharge being so designed that a cold cathode is disposed in the interior of the discharge container surrounding the laser capillary over a large portion of its length, and one anode is located exteriorly of the discharge container, it will be especially advantageous to apply the resistance layer on the outer face of the discharge container. In such arrangement the resistance layer is completely insulated with respect to high-voltage from the cathode and there are no contacting difficulties whatsoever, and any contact with the container contents under the influence of vacuum is avoided.

The invention has the further advantage that the discharge container can always be so constructed that a saving of space is achieved, independent of the place where the resistance layer is actually located on an insulated section of a discharge container, as it merely is necessary that the resistance layer and the cathode of the discharge container are sufficiently insulated by adequate insulating distances, whereby a gas discharge between the resistance layer and the cathode of the discharge container is prevented. The miniaturization of the entire arrangement is especially favorable with respect to gas laser arrangements in which the resonator mirrors are integrated with the discharge container, as a savings of space is of particular importance in integrated compact gas lasers of this type.

The invention also provides the further important advantage in a gas laser in that, where the discharge tube comprises a laser capillary, the power supply unit therefore may be designed as a tubular structure, for example a cast tubular block which can be slid over the laser capillary, with the electrical connection between the power supply portion and the resistance layer, connected with the anode, being effected by means of a contact spring extending from the inner wall of the tubular block.

BRIEF DESCRIPTION OF THE DRAWINGS

The invention will be explained in greater detail with respect to two sample embodiments, illustrated schematically in the drawings.

In the drawings wherein like reference character parts indicate like or corresponding parts.

DETAILED DESCRIPTION

Figure 1:
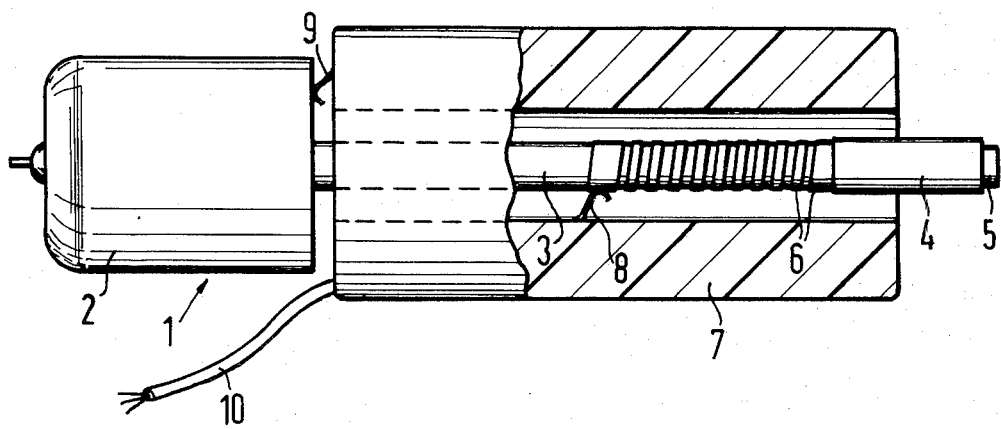
FIG. 1 illustrates a first illustrative embodiment of a discharge container in accordance with the invention, with portions of the structure broken away.

Referring to FIG. 1, the reference numeral 1 indicates generally a discharge container of a gas laser which comprises an enlarged cup 2, in which is disposed the cathode, and a capillary 3 connected thereto, preferably constructed of ceramic. The free end of the capillary is terminated, in sealed relation, by a partially metallized resonator mirror 5 which faces, in opposed relation, a completely metallized resonator mirror (not illustrated) disposed within the cathode cup 2. Disposed adjacent the metal anode 4 is a resistance layer 6 which is applied to the outer wall of the laser capillary 3 and functions as a current-limiting resistance for the discharge, the layer preferably being spirally or helically shaped, which also facilitates the determination or adjustment of the required resistance value.

The power-supply portion or part 7, for effecting operation of the discharge laser, is constructed as a tubular block, preferably a cast block, which may be slid over the capillary 3 with electrical contact to the resistance 6 and cathode structure in the cathode cup 2, being effected by respective contact springs 8 and 9. The power may be supplied to the structure 7 by a suitable power supply cable 10.

Gas laser arrangement of the type illustrated in FIG. 1 will usually be disposed in a tube which functions as a housing (not illustrated), with the mounting elements provided therein for the discharge container and the power supply portion being so arranged that upon insertion and locking of the discharge container or power supply portion respectively within the housing in the correct order, the respective contact springs will operatively engage their cooperable elements to provide the desired electrical connections.

Figure 2:
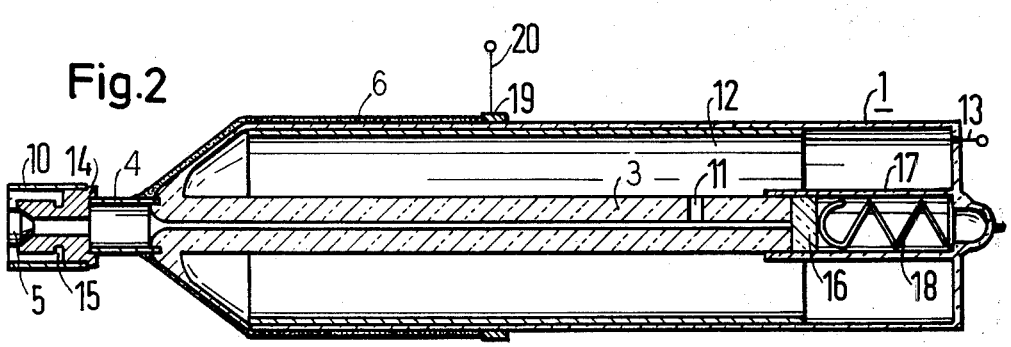
FIG. 2 is a longitudinal section of a second embodiment of a discharge container according to the invention.

In the construction of FIG. 2, the discharge container 1 may be constructed of glass within which is disposed a laser capillary 3, also constructed of glass and provided with an opening 11 operatively connecting the interior of the capillary with the interior of the container, the entire structure being vacuum-tight. The container 1 also contains a hollow cylindrically shaped cold cathode 12 which surrounds the laser capillary 3. The cold cathode 12 is operatively connected over a supply line 13 with a suitable high voltage supply (not illustrated). Mounted exteriorly of the end wall of the container structure carrying the capillary 3 is a tubular ring-shaped anode 4 which is coaxially disposed with respect to the laser capillary 3.

The anode 4 carries at its free or opposite end a mirror frame 14 in which is supported a mirror 5, the mirror frame 14, as is generally known, for example from German Offenlegungsschrift 2,007,939, being provided with a plastically deformable annular zone or area 15 having relatively little wall strength which may be deformed for adjustment purposes of the mirror and which is protected with a protective tubular shell 10 from accidental mechanical forces. The mirror 5 is partially reflecting and partially translucent, functioning as a decoupling mirror, and is cooperable with a second totally reflecting mirror 16 disposed at the opposite end of the capillary 3. The mirror 16 is supported by a tubular guide member 17 in correct parallel relation to mirror 5 and is urged by means of a spring 18 into firm engagement with the free end of the laser capillary 3. Further details with respect to the construction and production of a gas laser of this type appears in German publication 1,934,414.

Figure 3:
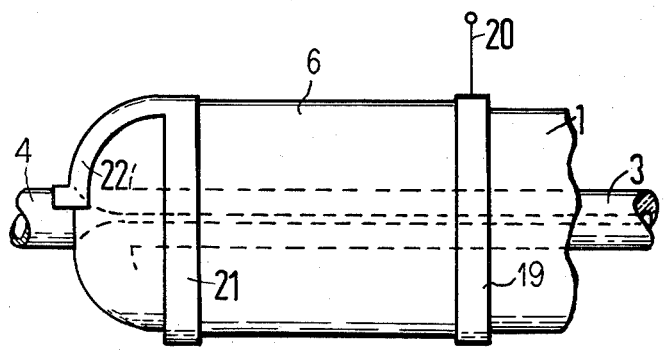
FIG. 3 illustrates a constructional variation to that illustrated in FIG. 2.

In this construction the resistance layer 6, provided in accordance with the invention, is applied to the exterior wall of the discharge container 1, in particular at the end thereof adjacent the anode 4. The resistance layer at its adjacent end extends to the anode 4 and thus is directly connected thereto, while the opposite end thereof is electrically connected to a conductive ring or sleeve 19, which encircles the container and is likewise secured thereto, and may for example, comprise a conductive lacquer layer which is provided with a terminal 20 supplied with high voltage from a suitable high voltage supply. In order to improve its adhesion, the resistance layer 6 may be burnt-in or sintered. A material suitable for use as the ohmic resistance comprises a layer of a mixture of lacquer and a carbon base which can be applied by immersion or suitable coating operation and then burnt-in at a maximum temperature of 210°C. From a practical standpoint, the current limiting resistance i.e., resistance layer 6 should be disposed in close proximity to the anode in order to prevent plasma oscillations. However, the resistance layer 6 does not have to be in direct proximity to the anode 4 but, so long as plasma fluctuations or oscillations do not occur, the resistance layer can be terminated at the end adjacent the anode by a conductive or ring 21 which in turn is electrically connected to the anode 4 over a conductor strip 22 as illustrated in FIG. 3. Such a construction, employing a space between the anode 4 and the resistance layer 6, is recommended with gas laser structures operating with a high trigger reliability.

It will be apparent from the above description that the invention is not limited to the specific embodiments illustrated. Likewise, a discharge container according to the invention need not be constructed of glass nor is it necessary that it employ a capillary tubular section. It can also be applied to other insulated sections of the discharge container and it is not necessary to the design that the electrodes be in a form of cold cathodes within the container or as ring anodes exteriorly of the container.

Having thus described my invention it will be obvious that although various minor modifications might be suggested by those versed in the art, it should be understood that we wish to embody within the scope of the patent granted hereon all such modifications as reasonably, and properly come within the scope of our contribution to the art.

We claim as our invention:

1. In a discharge structure for a gas laser having at least two electrodes for the production of a gas discharge, and a container in which said gas discharge takes place, the combination of said container having a wall portion thereof, and a resistance layer applied to said wall portion, operatively connected to one of said electrodes and forming a current-limiting resistor therefor, said resistance layer being spaced from the other of said electrodes a distance sufficient to provide adequate insulation for the prevention of a gas discharge therebetween.

2. A discharge structure according to claim 1, wherein the discharge container comprises a tubular structure forming a laser capillary, a hollow cathode disposed within the discharge container and surrounding the laser capillary over a relatively large part of its length, and an anode located exteriorly of the discharge container with said resistance layer being located on the exterior wall of the discharge container.

3. A discharge structure according to claim 1, wherein the resistance layer extends directly to an electrode forming the anode for said laser.

4. A discharge structure according to claim 3, wherein the discharge container comprises a tubular structure forming a laser capillary, a hollow cathode disposed within the discharge container and surrounding the laser capillary over a relatively large part of its length, and an anode located exteriorly of the discharge container with said resistance layer being located on the exterior wall of the discharge container.

5. A discharge structure according to claim 1, wherein the resistance layer is terminated at both ends by respective conductive sleeves carried by the container, one of which is electrically connected with an anode electrode over a conductor, with a space existing between such anode and the adjacent sleeve.

6. A discharge structure according to claim 5, wherein the discharge container comprises a tubular structure forming a laser capillary, a hollow cathode disposed within the discharge container and surrounding the laser capillary over a relatively large part of its length, and an anode located exteriorly of the discharge container with said resistance layer being located on the exterior wall of the discharge container.

7. A discharge structure according to claim 1, wherein the discharge container is provided with a tubular section forming a laser capillary, said resistance layer being applied on an insulating section of the outer wall of the laser capillary.

8. A discharge structure according to claim 7, comprising in further combination a power supply portion in the form of a tubular block which is slidable over the laser capillary, and a contact spring carried by said tubular block at the inner wall thereof arranged to form an electrical connection between the power supply portion and said resistance layer, and thus to the associated electrode.

9. A discharge structure according to claim 7, wherein said laser capillary is constructed of a ceramic material.

10. A discharge structure according to claim 7, wherein said resistance layer has a helically shaped configuration.

11. A discharge structure according to claim 9, comprising in a further combination a power supply portion in the form of a tubular block which is slidable over the laser capillary, and a contact spring carried by said tubular block at the inner wall thereof arranged to form an electrical connection between the power supply portion and said resistance layer, and thus to the associated electrode.

12. A discharge structure according to claim 10, wherein said laser capillary is constructed of a ceramic material.

13. A discharge structure according to claim 12, comprising in further combination a power supply portion in the form of a tubular block which is slidable over the laser capillary, and a contact spring carried by said tubular block at the inner wall thereof arranged to form an electrical connection between the power supply portion and said resistance layer, and thus to the associated electrode.

14. A discharge structure according to claim 10, comprising in further combination a power supply portion in the form of a tubular block which is slidable over the laser capillary, and a contact spring carried by said tubular block at the inner wall thereof arranged to form an electrical connection between the power supply portion and said resistance layer, and thus to the associated electrode.

15. A discharge structure according to claim 14, comprising in further combination resonator mirrors cooperable with said laser capillary, which are integrated with the discharge container.

16. A discharge structure according to claim 2, comprising in further combination resonator mirrors cooperable with said laser capillary, which are integrated with the discharge container.

* * * * *